United States Patent

[11] 3,582,087

[72] Inventors David Bella
Northlake;
Seymour Kessler, Wilmette, Ill.
[21] Appl. No. 818,258
[22] Filed Apr. 22, 1969
[45] Patented June 1, 1971
[73] Assignee Zenith Radio Corporation
Chicago, Ill.

[54] DUAL-STYLUS PHONOGRAPH CARTRIDGE
3 Claims, 5 Drawing Figs.

[52] U.S. Cl. ........ 274/37
[51] Int. Cl. ........ G11b 3/02
[50] Field of Search ........ 274/36, 37, 38; 179/100.41 S, ST; 274/31

[56] References Cited

UNITED STATES PATENTS 3,047,676 7/1962 Dally et al. ........ 274/37
3,235,673 2/1966 Wiggins et al. ........ 274/36

*Primary Examiner*—Leonard Forman
*Assistant Examiner*—Charles E. Phillips
*Attorney*—John J. Pederson

ABSTRACT: A phonograph cartridge having a dual-stylus assembly of the turret type wherein one stylus is designed to track stereo record grooves and the other stylus is designed to track monaural record grooves. The cartridge housing has a vertical opening therein and a recessed portion at the base of the opening which forms a seat. A turret shaft is supported in the opening and is axially and rotatably movable therein. The shaft has a pair of cantilever stylus support arms attached to its free end. The turret assembly is adapted for rotation to a predetermined orientation in order to selectively place one of the styli in a record tracking position. A spring is provided for biasing the turret shaft axially and upwardly into the seat to releasably maintain this orientation. Two cam surfaces are provided at the base of the turret shaft to operatively engage the sidewalls of the seat such that, upon mere rotation of the turret shaft, the spring bias is overcome to release the turret assembly from its orientation and permit rotation thereof to place the other stylus in a record-tracking position.

PATENTED JUN 1 1971 3,582,087

Inventors
David Bella
Seymour Kessler
By John J. Pederson
Attorney

DUAL-STYLUS PHONOGRAPH CARTRIDGE

BACKGROUND OF THE INVENTION

Different types of phonograph records have various types of grooves which require a particular type of stylus for satisfactory record tracking. Stereophonic records, for example, have a very delicate groove which requires a stylus having a relatively small size. Some monaural records on the other hand, such as the older records which require a playback speed of 78 r.p.m., have a relatively larger groove and therefore require a larger stylus for satisfactory tracking. Hence, it is quite desirable to provide a home-entertainment-type phonograph record player having a dual-stylus phonograph cartridge which may be easily manipulated by the average consumer to select the proper stylus for tracking stereophonic or monaural records.

Some conventional dual-stylus phonograph cartridges adapted to track both of the above types of records often employ a "flip-over" type of stylus support assembly having the two types of styli described above affixed near the free end of a single stylus support arm with one stylus disposed diametrically opposite to the other. A lever is affixed to the arm and extends outwardly to the side of the phonograph cartridge. Thus, the arm may be rotated through 180° about a substantially horizontal axis in order to enable selection of one stylus or the other. Each type of stylus however, requires a support structure having particular mass and compliance characteristics. Affixing two styli to a common support arm consequently results in the performance of one stylus being affected to some extent by the other stylus. This necessarily produces a sacrifice in performance in terms of frequency response, tracking, loading, and the like.

Other conventional phonograph cartridges have at least partially overcome the aforesaid limitation by using a dual-stylus assembly of the turret type wherein a pair of cantilever stylus support arms are oppositely attached to the base of a turret shaft to form a turret assembly. The two styli are respectively attached to the free ends of the stylus arms and a vertical opening is provided in the cartridge for permitting the turret shaft to extend therethrough. The turret assembly may thus be rotated about a substantially vertical axis through 180 or even 360° by means of a knob attached to the top of the turret shaft, in order to selectively place one of the two styli in a record-tracking position. The base of the turret shaft further includes indexing means for orienting the assembly such that one of the stylus support arms and its associated stylus is in a record-tracking position. The indexing is typically accomplished by providing the base of the turret shaft with a transverse member which engages a correspondingly shaped recess in the bottom of the cartridge housing to thereby seat the turret post in the cartridge housing and establish the necessary orientation for the selected stylus and corresponding support arm. This structure is symmetrical so that either stylus may be so indexed. A spring is provided to bias the turret assembly in an upward direction so as to releasably hold the base of the turret shaft in its seat. To change one stylus for the other, a user must first depress the knob attached to the top of the turret shaft to disengage the transverse member from its seat in order to enable him to then rotate the turret shaft 180° to bring the other stylus into the proper position. The user then releases the knob allowing the spring to urge the turret assembly in an upward direction and thereby reengage the transverse member with the seat.

While the dual-stylus assembly of the turret type thus far described overcomes the aforementioned performance limitation of the "flip-over" assembly, it is still subject to the disadvantage of being easily broken by an unsophisticated user. Most home-entertainment-type phonograph users, who often include impatient teenagers or even small children, do not appreciate the delicacy of a phonograph cartridge and the care required therefor. In his haste or because of his lack of proper appreciation for the mechanism involved, such a user often merely rotates the knob affixed to the top of the turret shaft without first depressing it to release the assembly from its seat.

This action necessarily results in damage to the cartridge in the form of a broken knob, turret shaft, or associated cartridge structure.

It is therefore a primary object of the invention to provide a new and improved phonograph cartridge with a dual-stylus assembly of the turret type which is easy to operate and economical to construct.

It is a further object of the invention to provide such a new and improved assembly which has a high degree of reliability and which protects the delicate styli from accidental damage.

SUMMARY OF THE INVENTION

In accordance with the invention, a phonograph cartridge for use with stereo and monaural records, having a dual-stylus assembly of the turret type wherein one stylus is designed to track stereo record grooves and the other stylus is designed to track monaural record grooves, comprises a cartridge housing having a vertical opening therein and a recessed portion at the base of the opening forming a seat. Also provided are support means, including a turret shaft supported in the opening and axially and rotatably movable therein and a pair of cantilever stylus support arms attached to the base of the turret shaft, each arm having one of the styli attached near its free end, adapted for rotation to a predetermined orientation to selectively place one of the styli in a record-tracking position. Spring means are included for biasing the support means in an axial direction. Further provided are cam means affixed to the support means and cooperative with the spring means for engaging the seat and releasably holding the support means at the predetermined orientation, and responsive to mere rotation of the support means for automatically overcoming the bias and vertically displacing the support means to disengage the cam means to place the other of the styli in the record-tracking position.

BRIEF DESCRIPTION OF THE DRAWING

The features of the present invention which are believed to be novel are set forth with particularity in the appended claims. The invention, together with further objects and advantages thereof, may be best be understood by reference to the following description taken in connection with the accompanying drawing, in the several figures of which like reference numerals identify like elements, and in which:

DESCRIPTION OF THE PREFERRED EMBODIMENT

Figures 1, 2, 3, 4, 5:
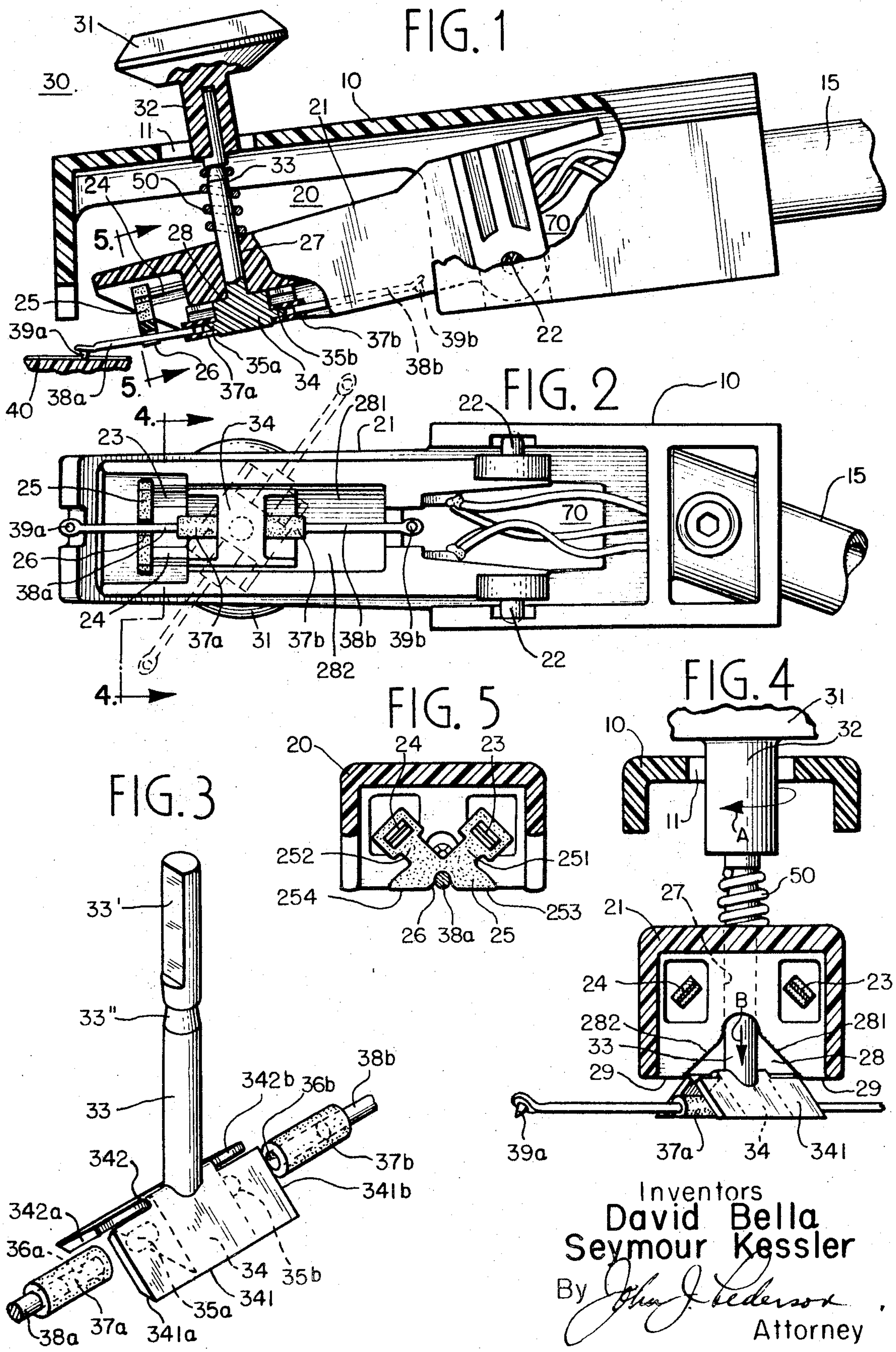
FIG. 1 is a side elevational view, partially in section, of a dual-stylus phonograph cartridge embodying the principles of the present invention.
FIG. 2 is a bottom view of the cartridge illustrated in FIG. 1.
FIG. 3 is a perspective view of the dual-stylus turret assembly of the cartridge shown in FIG. 1.
FIG. 4 is a sectional view taken along line 4–4 of FIG. 2.
FIG. 5 is a sectional view taken along line 5–5 of FIG. 1.

With reference to FIG. 1, a phonograph cartridge 20 having a dual-stylus assembly 30 of the turret type embodying the principles of the present invention is shown within the tone-arm compartment 10 which is attached to the end of tone arm 15 (partially shown). Cartridge 20 is mounted within compartment 10 by means of a pair of pivots 22 which are received by a corresponding pair of spaced, opposed bearings (not shown) in compartment 10. Although not shown in the drawing, a spring means, including a cantilever spring attached to the top of cartridge 20, may be employed in conjunction with pivots 22 to bias the cartridge in a desired operating position. The employment of this type of mounting permits the cartridge to operatively engage a phonograph record for playback thereof in a particularly advantageous manner, the details of which are described and claimed in U.S. Pat. No. 3,404,895, issued to Hathaway and assigned to the same assignee as the present invention. The tone arm and compartment shown are merely representative of a typical tone arm construction with which the cartridge may operate and do not form part of the invention. Cartridge 20 includes a cartridge housing 21 which may also be of any conventional construction adapted to operate with a dual-stylus assembly of the turret type. The cartridge housing shown is a one-piece unit constructed of molded plastic. A vertical opening 27 is provided therein for permitting extension of turret assembly 30 therethrough. At the base of opening 27 a recessed portion 28 is provided in cartridge housing 21 to form a seat.

Cartridge 20 further includes transducer means for converting mechanical motion into a corresponding electrical signal. Any suitable type of transducing means may be utilized for practicing the present invention, depending on the type of records with which the cartridge is designed to be used. A very desirable construction for the transducer means especially suited for playback of modern stereophonic records, however, is that of the type shown which comprises two generating elements, 23 (not shown in FIG. 1 because of the figure being partially in section; see FIG. 2) and 24, each consisting of an elongated flexible piezoelectric cantilever member of rectangular cross section, and together mounted along parallel spaced axes with their transverse axes normal to each other and each at an angle of 45° relative to the partially shown record 40. It has been found desirable to construct the piezoelectric generating elements from a barium titanate ceramic to form a bimorph generating element. The front end of each generating element is embedded in a yoke 25 which is made of an electrically insulating compliant material such as rubber or vinyl plastic and floats within cartridge housing 21. A notch 26 is provided in yoke 25 for engaging a stylus support arm to transmit motion thereof to generating elements 23 and 24. For a more detailed drawing and description of yoke 25, see the discussion of FIG. 5 below. The rear end of each generating element is embedded in a block (not shown) to the right of yoke 25 in FIG. 1, which block may also be made of an electrically insulating material such as rubber or vinyl plastic and may be secured within cartridge housing 21. The generating elements are prepolarized to generate a voltage which varies in proportion to the magnitude of the transverse forces applied by means of yoke 25, which forces correspond to the motion of a stylus tracking a record groove. The electrical output signals of the generating elements may be coupled to suitable electronic amplifying equipment (not shown) by means of a group of wires 70, to complete reproduction of the recorded sound.

In accordance with the invention, turret assembly 30 in the illustrated embodiment includes a knob 31 attached by means of a knob shaft 32 to support means consisting of a turret shaft 33, cam means 34, two hollow rubber coupling members **37*a* and 37*b*, and two cantilever stylus support arms 38*a* and 38*b*. A stylus 39*a* is attached near the free end of arm 38*a* and another stylus 39*b* is similarly attached to arm 38*b*. The two styli may be of different types, for example, one may be of a type designed to track stereo record grooves and the other monaural record grooves. A helical spring 50 on shaft 33 biases turret assembly 30 upwardly to releasably hold cam means 34 in seat 28**.

Still referring to FIG. 1, stylus **39*a* is shown in a record-tracing position on partially shown record 40. In order to change styli and place stylus 39*b* in a record-tracking position on record 40, in accordance with the invention, it is necessary to merely rotate knob 31 180°. As hereinafter described in greater detail, this mere rotation causes the support means to automatically overcome the bias exerted by spring 50 and vertically displace itself to disengage cam means 34 from seat 28 and thereby enable rotation of the support means to place stylus 39*b* in a record-tracking position on record 40**.

FIG. 2 illustrates a bottom view of the phonograph cartridge assembly shown in FIG. 1. The superimposed broken-line portion of the drawing depicts the support means in a moved position in which it has been rotated approximately 30° clockwise (when viewed from the top) from its operating position. Cam means 34, at this 30° rotation point, is on the verge of completing its disengagement with seat 28, as shown in greater detail in FIG. 4.

With reference to FIG. 3, the support means described above in conjunction with FIG. 1 is shown in further detail. Turret shaft 33 is provided with a flat portion 33' at its top for a keying engagement with knob shaft 32 shown in FIG. 1. Below flat 33' is an indented portion 33'' which provides a means for attaching the top end of spring 50 (also shown in FIG. 1) to turret shaft 33. In accordance with the invention, cam means 34 is affixed to the support means at the base of turret shaft 33. Shaft 33 and cam means 34 may be of separate construction, however, it is preferable in terms of manufacturing cost to use a one-piece construction such as a molded plastic part. When operatively oriented, cam surfaces 341 and 342 of cam means 34 engage a pair of corresponding surfaces (281 and 282, shown in FIG. 5) of seat 28.

In this embodiment, two elastomeric mounting members, **37*a* and 37*b*, are used to flexibly affix stylus support arms 38*a* and 38*b* to turret shaft 33 by means of two fingerlike projections, 35*a* and 35*b*. Mounting members 37*a* and 37*b* have corresponding hollow portions 36*a* and 36*b*, the opposite ends of which respectively receive projections 35*a* and 35*b* and arms 37*a* and 37*b*. A suitable cement may be applied to maintain these connections. Although this type of construction is not essential to the invention, based upon past experience it has been found preferable where maximum protection and reliability for the styli and their support arms, in addition to proper pivot action for satisfactory record tracking, are desired. With such an elastomeric coupling connection, accidental jarring or lateral contact may be sustained by the structure without appreciable damage to the cartridge. Moreover, the stylus support arms in this type of construction may even be subjected to forces which cause them to be pivoted about their mountings at angles of 90° or more relative to their normal position and still return to the normal position without permanent damage. Cam surfaces 341 and 342 may be extended laterally from cam means 34 as shown to form protective flaps 341*a* and 341*b*, and 342*a* and 342*b*** respectively, to prevent damage to the stylus arm mountings resulting from contact with various portions of the cartridge housing bottom during turret rotation.

With reference to FIG. 4, a cross-sectional view taken along line 4—4 of FIG. 2 shows the operation of the invention in greater detail. The recessed portion at the base of vertical opening 27 in cartridge housing 21 forming a seat 28 is also shown more clearly in this view. Seat 28 may take on any desirable shape so long as the seat walls are chamfered to form a beveled seat having appropriate cam bearing surfaces adapted for mating engagement with a tapered cam element and for alignment of the operative stylus support arm such that it engages notch 26 of yoke 25. It has been found to be advantageous, however, to chamfer the seat walls such that cam bearing surfaces 281 and 282 are at an angle of approximately 45° relative to the bottom 28 of cartridge housing 21. This achieves a desirable balance between the amount of effort required to rotate the support means from an orientation position and the amount of vertical displacement necessary for clearance between the relatively stationary cartridge parts and the supports means during rotation thereof. A further advantage may be obtained by laterally extending recessed portion 28 such that it provides a partial enclosure for the non-record-tracking stylus and support arm and thereby provides protection against damage to the stylus structure from lateral contact.

In FIG. 4, as also depicted by the broken lines in FIG. 2, the support means has been rotated approximately 30° from its record-playing orientation as indicated by arrow A. In response to mere rotation by knob 31 (partially shown), in accordance with the invention, cam surfaces 341 and 342 of cam means 34 have respectively engaged cam bearing surfaces 281 and 282 to automatically overcome the bias exerted by spring 50 and vertically displace the support means in a downward direction, as indicated by arrow B, to substantially disengage cam means 34 from seat 28. Upon further rotation cam means 34 completely disengages itself from seat 28 to thereby enable rotation of the support means to place the other of the styli (**39*b*, not shown in FIG. 4) in a record-tracking position. The top of cam means 34, which may be of a solid construction or slotted as shown, slides on a bearing surface formed by bottom 28 of cartridge housing 21 during the rotation. Upon even further rotation, the support means approaches the other orientation position. As soon as the top of cam means 34 begins to reenter seat 28, spring 50 exerts enough axial bias on the support means to snap cam means 34 fully into seat 28 to thereby complete rotation of the support means and automatically orient the support means such that the other stylus is placed in a record-tracking position and its associated support arm is aligned for engagement with notch 26 in yoke 25**.

In FIG. 5, a cross-sectional view taken along line 5–5 of FIG. 1 shows yoke 25 in greater detail. Generating elements 23 and 24 are embedded in yoke 25 and stylus support arm **38*a* engages notch 26 such that the tracking motion of stylus 39*a* (not shown) is transmitted to generating elements 23 and 24 by means of transverse yoke sections 251 and 252, respectively. The bottom portions 253 and 254 of yoke 25** are preferably made flat to avoid any hindrance thereby when changing styli.

Thus, there has been shown a new and improved phonograph cartridge having a dual-stylus assembly of the turret type. The assembly requires a minimum number of parts and is very easily constructed. Moreover, by its provision for automatic vertical displacement of the turret assembly in response to mere rotation thereof, it avoids the heretofore frequent problem of cartridge damage including breakage of the turret knob and/or turret shaft resulting from attempts at rotating the knob of a conventional dual-stylus turret assembly without first depressing it to release the assembly from its seat.

While a particular embodiment of the invention has been shown and described, it will be obvious to those skilled in the art that changes and modifications may be made without departing from the invention in it broader aspects, and, therefore, the aim in the appended claims is to cover all such changes and modifications as fall within the true spirit and scope of the invention.

We claim:

1. A phonograph cartridge for use with stereo and monaural records and having a dual-stylus assembly of the turret type wherein one stylus is designed to track stereo record grooves and the other stylus is designed to track monaural record grooves, comprising:

a cartridge housing having a vertical opening therein and a recessed portion at the base of said opening forming a seat;

support means, including a turret shaft supported in said opening and axially and rotatably movable therein and a pair of cantilever stylus support arms attached to the base of said turret shaft, each said arm having one of said styli attached near its free end, adapted for rotation to a predetermined orientation to selectively place one of said styli in a record-tracking position;

spring means for biasing said support means in a direction so as to hold a cam means in said seat; and said cam means affixed to said support means and cooperative with said spring means for engaging said seat and releasably holding said support means at said orientation, and responsive to mere rotation of said support means for automatically overcoming said bias and vertically displacing said support means to disengage said cam means from said seat and thereby enable rotation of said support means to place the other of said styli in said record-tracking position.

2. A phonograph cartridge according to claim 1, in which said cam means further comprises a pair of cam surfaces having lateral extensions therefrom to form protective flaps for preventing damage to said stylus support arm attachment during rotation of said turret.

3. A phonograph cartridge according to claim 1, in which said recessed portion of said housing is chamfered to form a beveled seat, and said cam means comprises a tapered element adopted for mating engagement with said beveled seat.